United States Patent
Wu et al.

(10) Patent No.: US 12,435,513 B2
(45) Date of Patent: Oct. 7, 2025

(54) REINFORCED RECYCLED LUMP/AGGREGATE CONCRETE PRECAST COLUMN AND CONSTRUCTION METHOD THEREOF

(71) Applicant: SOUTH CHINA UNIVERSITY OF TECHNOLOGY, Guangzhou (CN)

(72) Inventors: Bo Wu, Guangzhou (CN); Lang Lin, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 203 days.

(21) Appl. No.: 18/024,503

(22) PCT Filed: Dec. 31, 2020

(86) PCT No.: PCT/CN2020/142575
§ 371 (c)(1),
(2) Date: Mar. 3, 2023

(87) PCT Pub. No.: WO2022/052387
PCT Pub. Date: Mar. 17, 2022

(65) Prior Publication Data
US 2023/0323666 A1    Oct. 12, 2023

(30) Foreign Application Priority Data

Sep. 9, 2020 (CN) .......................... 202010942361.3

(51) Int. Cl.
*E04C 3/34* (2006.01)
*B28B 23/02* (2006.01)
(Continued)

(52) U.S. Cl.
CPC ................ *E04C 3/34* (2013.01); *B28B 23/02* (2013.01); *E04C 5/0636* (2013.01); *B28B 23/18* (2013.01); *C04B 28/02* (2013.01)

(58) Field of Classification Search
CPC .......... E04C 3/34; E04C 5/0636; B28B 23/02; B28B 23/0093; B28B 23/18; B28B 23/00; C04B 28/02; Y02W 30/91
See application file for complete search history.

(56) References Cited

U.S. PATENT DOCUMENTS 3,619,432 A * 11/1971 Harrington ............. E04G 11/04
D25/19
5,367,854 A * 11/1994 Kim ........................ E04G 21/06
52/741.1

(Continued)

FOREIGN PATENT DOCUMENTS

CN         2516288         10/2002
CN         102677901        9/2012
(Continued)

OTHER PUBLICATIONS

"International Search Report (Form PCT/ISA/210) of PCT/CN2020/142575," mailed on May 26, 2021, with English translation thereof, pp. 1-5.

(Continued)

*Primary Examiner* — Omar F Hijaz
(74) *Attorney, Agent, or Firm* — JCIPRNET

(57) ABSTRACT

A reinforced recycled block/aggregate concrete precast column and a construction method are provided. The reinforced recycled block/aggregate concrete precast column includes several first one-bar hoops, vertical reinforcement bars, several second one-bar hoops, a flexible hinge area, and recycled block/aggregate concrete; the first one-bar hoops and second one-bar hoops are each provided with an anchor end; the first one-bar hoops and second one-bar hoops are disposed in the flexible hinge area, and only the second one-bar hoops are disposed outside the flexible hinge area; the outer edge of each first one-bar hoop is flush with the outer surface of the reinforced recycled block/aggregate (Continued)

concrete precast column; and the interior of the reinforced recycled block/aggregate concrete precast column is filled with the recycled block/aggregate concrete, thereby greatly increasing the recycling rate of engineering waste, reducing shedding of a concrete protective layer in the flexible hinge area of the column.

10 Claims, 3 Drawing Sheets

(51) Int. Cl.
*B28B 23/18* (2006.01)
*C04B 28/02* (2006.01)
*E04C 5/06* (2006.01)

(56) References Cited

U.S. PATENT DOCUMENTS

| | | | |
|---|---|---|---|
| 11,142,911 B2 * | 10/2021 | Chen | E04C 5/0622 |
| 2009/0178356 A1 * | 7/2009 | Baumann | E04C 3/34 52/414 |
| 2018/0162776 A1 * | 6/2018 | Kahn | C04B 28/02 |
| 2019/0078316 A1 * | 3/2019 | Yin | E04C 5/0609 |
| 2019/0257094 A1 * | 8/2019 | Zhang | E04C 3/20 |
| 2019/0284804 A1 * | 9/2019 | Ibrahim | E04C 2/46 |

FOREIGN PATENT DOCUMENTS

| | | | | |
|---|---|---|---|---|
| CN | 103046692 | | 4/2013 | |
| CN | 203654610 | | 6/2014 | |
| CN | 105256947 | | 1/2016 | |
| CN | 210508044 | | 5/2020 | |
| JP | 3147732 | | 1/2009 | |
| WO | WO-9923325 A1 * | 5/1999 | | E04C 5/0604 |

OTHER PUBLICATIONS

Wu Bo et al., "Experimental Study on Mechanical Behaviors of Cement Mortar Containing Excavated Soil", Journal of South China University of Technology (Natural Science Edition), May 2020, submit with English abstract, pp. 1-8.

Gan Fu et al., "Research Progress on The Properties of Recycled Coarse Aggregates and Recycled Concrete", China Concrete and Cement Products, Sep. 2018, submit with English abstract, pp. 102-107.

Wu Bo et al., "State-Of-The-Art of Recycled Mixed Concrete (RMC) and Composite Structural Members Made of RMC", Engineering Mechanics, Jan. 2016, submit with English abstract, pp. 1-10.

Zhang Shuai, "Seismic Performances and the Corresponding Size Effect of RC Columns", College of Architecture and Civil Engineering, Beijing University of Technology, Apr. 2018, submit with English abstract, pp. 1-81.

* cited by examiner

REINFORCED RECYCLED LUMP/AGGREGATE CONCRETE PRECAST COLUMN AND CONSTRUCTION METHOD THEREOF

CROSS-REFERENCE TO RELATED APPLICATION

This application is a 371 of international application of PCT application serial no. PCT/CN2020/142575, filed on Dec. 31, 2020, which claims the priority benefit of China application no. 202010942361.3, filed on Sep. 9, 2020. The entirety of each of the above-mentioned patent applications is hereby incorporated by reference herein and made a part of this specification.

TECHNICAL FIELD

The present disclosure relates to the technical field of construction and demolition waste recycling, in particular to a reinforced recycled lump/aggregate concrete precast column and a construction method thereof.

BACKGROUND

In recent years, China's sand and gravel resources have been increasingly depleted, and many cities are in shortage of sand and gravel with skyrocketing price. Meanwhile, China produces more than 3.5 billion tons of construction and demolition wastes every year, most of which are disposed by means of heaping and landfilling and occupy a large amount of land. Construction and demolition wastes contain a large amount of excavated soil and waste concrete. For conventional recycled aggregate concrete and recycled lump concrete, only waste concrete is recycled in the form of recycled coarse aggregates (Gan Fu, Zhou Maixi, Pu Qi. *Research progress on the properties of recycled coarse aggregates and recycled concrete.* Concrete and cement products, 2018(09):102-107) or recycled lumps (WU Bo, J I Mingming, ZHAO Xinyu. *State-of-the-art of recycled mixed concrete (RMC) and composite structural members made of RMC.* Engineering mechanics, 2016, 33(01):1-10), and recycling of excavated soil is ignored, which leads to low overall recycling ratio of construction and demolition wastes.

Reinforced concrete structures are widely used in engineering construction due to their good bearing capacity and economy. Since concrete covers of reinforced concrete columns are not effectively restrained by stirrups, the column-end concrete covers are prone to fall off under the action of an earthquake. After the concrete covers fall off, the compressive and shear bearing capacity and ductility of the columns are significantly reduced, thereby leading to an increased risk of floor collapse (Zhang Shuai. *Seismic performances and the corresponding size effect of RC columns.* Beijing University of Technology, 2018). Moreover, in conventional reinforced concrete columns, stirrups are usually made of steel bars with a yield strength of no more than 500 MPa, and are easy to yield during bearing of the columns, such that the concrete restraint capability of the stirrups cannot be further improved, and the mechanical properties of the columns are affected. In addition, the stirrups inside the columns usually include a plurality of rectangular closed stirrups and tie bars. During construction, they need to pass through longitudinal bars one by one and are subjected to multiple binding processes to form composite stirrups, such that inefficient construction is caused.

In conclusion, the prior art has the problems such as low recycling ratio of construction and demolition wastes in concrete, incapability of restraining column-end concrete covers, limited improvement in restraint capability, cumbersome construction flow of stirrups in reinforced concrete columns, etc.

SUMMARY OF INVENTION

In order to overcome the shortcomings and deficiencies in the prior art, an objective of the present disclosure is to provide a reinforced recycled lump/aggregate concrete precast column and a construction method thereof. According to the present invention, the recycling ratio of construction and demolition wastes can be greatly increased by means of recycled lump/aggregate concrete in which fresh concrete contains recycled coarse aggregates and excavated soil; the degree of shedding of a concrete cover can be significantly reduced by effectively restraining the concrete cover, thereby improving the bearing capacity and ductility of a concrete column under the action of an earthquake; and by means of stirrups in the form of high-strength one-bar confinements, the stronger restraint capability can be provided for column-end concrete, and significantly a stirrup placement flow is simplified and binding processes are reduced, such that the construction efficiency is improved.

The present invention is at least implemented by one of the technical solutions below.

A reinforced recycled lump/aggregate concrete precast column, including a plurality of first one-bar confinements, longitudinal bars, a plurality of second one-bar confinements, a plastic hinge region, and recycled lump/aggregate concrete;

each of the first one-bar confinements and each of the second one-bar confinements being provided with an anchoring end;

the plurality of first one-bar confinements and the plurality of second one-bar confinements being arranged in the plastic hinge region, and only the second one-bar confinements being arranged outside the plastic hinge region; outer edges of the first one-bar confinements being flush with outer surfaces of the reinforced recycled lump/aggregate concrete precast column, the first one-bar confinements being configured to restrain a concrete cover, and a vertical spacing between the two adjacent first one-bar confinements being not greater than 200 mm; the second one-bar confinements abutting against the longitudinal bars, and the second one-bar confinements being configured to restrain the longitudinal bars;

the anchoring end being formed by bending at 135° twice; and an interior of the reinforced recycled lump/aggregate concrete precast column being filled with the recycled lump/aggregate concrete, the recycled lump/aggregate concrete consisting of fresh concrete and demolished concrete lumps, and the fresh concrete being recycled aggregate concrete containing recycled coarse aggregates and excavated soil.

Further, a mass ratio of the recycled coarse aggregates to natural coarse aggregates in the fresh concrete is not greater than 4, the excavated soil partially or completely replaces natural sand, and a mass ratio of the excavated soil to the natural sand is not less than 1.

Further, a strength grade of the fresh concrete is not lower than C40; and the demolished concrete lumps are lumps formed by breaking old buildings, structures, and roads after removing all or part of steel bars, and a characteristic size of each of the demolished concrete lumps is not less than 60 mm.

Further, a mass ratio of the demolished concrete lumps to the fresh concrete in the recycled lump/aggregate concrete is (1:4) to (2:3).

Further, each of the first one-bar confinements and the second one-bar confinements is a stirrup formed by bending a high-strength steel bar for multiple times, and a size of an outer edge of each of the first one-bar confinements is larger than the size of an outer edge of each of the second one-bar confinements.

Further, the length of each of two straight segments of the anchoring end is not less than a larger value in 10 d and 75 mm, and d is the diameter of the stirrup.

Further, a height of the plastic hinge region is between 1.0 h and 2.0 h, and h is a cross-sectional height of the reinforced recycled lump/aggregate concrete precast column.

Further, a spacing between the two adjacent second one-bar confinements in the plastic hinge region is not greater than a smaller value in 6 D and 100 mm, and D is a minimum diameter of the longitudinal bars; and a spacing between the two adjacent second one-bar confinements outside the plastic hinge region is not greater than 10 D.

Further, a yield strength of each of the first one-bar confinements and the second one-bar confinements is not less than 500 MPa.

A construction method for the reinforced recycled lump/aggregate concrete precast column, including the following steps:
(1): processing and making a plurality of first one-bar confinements, longitudinal bars, and a plurality of second one-bar confinements;
(2): arranging the longitudinal bars, positioning a vertical position of each of the first one-bar confinements and the second one-bar confinements, and simultaneously positioning a relative horizontal position between each of the first one-bar confinements and each of the longitudinal bars;
(3): arranging the first one-bar confinements and the second one-bar confinements in the plastic hinge region in sequence, and simultaneously completing arranging of the second one-bar confinements in the remaining region;
(4): completing formwork making and horizontal installation of the reinforced recycled lump/aggregate concrete precast column, at this time an outer edge of each of the first one-bar confinements being in contact with an inner surface of a formwork; and
(5): fully wetting demolished concrete lumps in advance, and casting the reinforced recycled lump/aggregate concrete precast column by means of horizontal construction; and during casting, first putting the demolished concrete lumps into the formwork at a time, then pouring fresh concrete into the formwork and fully vibrating until the casting is completed.

Compared with the prior art, the present invention has the following advantages and effects:
(1) the total recycling ratio (at most about 70%, much higher than that of conventional recycled aggregate concrete (generally at most about 25%) and conventional recycled lump concrete (generally at most about 40%)) of construction and demolition wastes in concrete is significantly increased, the consumption of non-renewable resources such as sand, gravel, etc. is greatly reduced, the dilemma of shortage of natural sand and gravel is alleviated, and the concept of green development proposed by the central government is highly fitted;
(2) the high-strength one-bar confinements for restraining the concrete cover can effectively restrain all the concrete in the plastic hinge region, which significantly alleviates the shedding of the concrete cover, thereby improving the bearing capacity and ductility of the concrete column under the action of the earthquake;
(3) compared with normal-strength stirrups, the high-strength one-bar confinements have the higher yield strength and the better restraint effect on the concrete and the longitudinal bars, which helps to further improve the mechanical properties of the column; and
(4) compared with conventional composite stirrups, the high-strength one-bar confinements can significantly simplify the stirrup placement flow and reduce the binding processes thereof, thereby improving the construction efficiency.

DESCRIPTION OF EMBODIMENTS

The present invention is further described in detail below in conjunction with the embodiments and the accompanying drawings, but the implementations of the present invention are not limited thereto. It should be noted that if there are processes not particularly described in detail below, they may be implemented by those skilled in the art with reference to the prior art.

Figure 1:
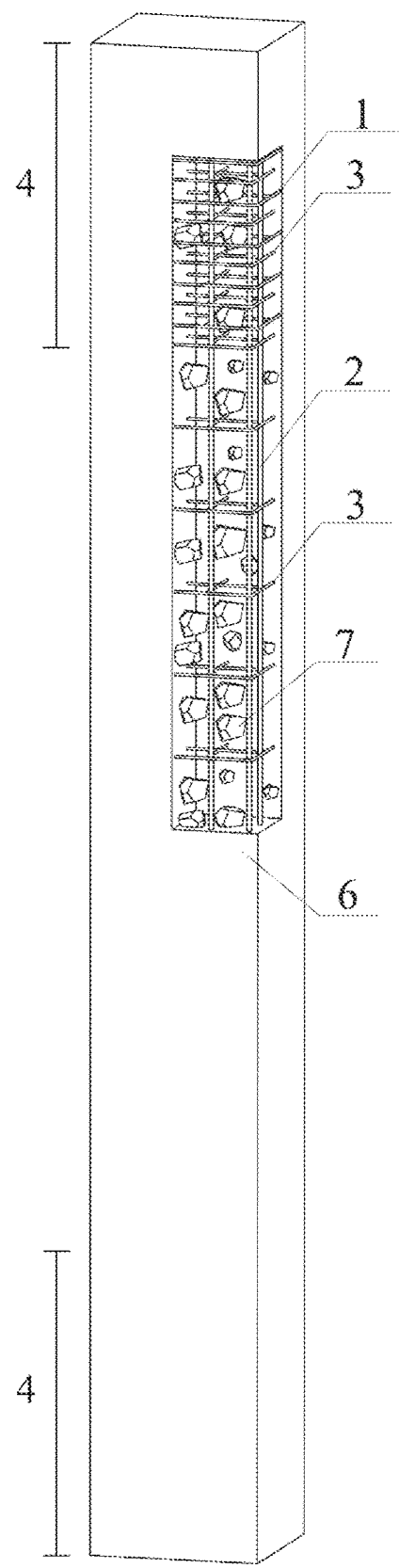
FIG. 1 is a schematic structural diagram of a reinforced recycled lump/aggregate concrete precast column.
Figure 2:
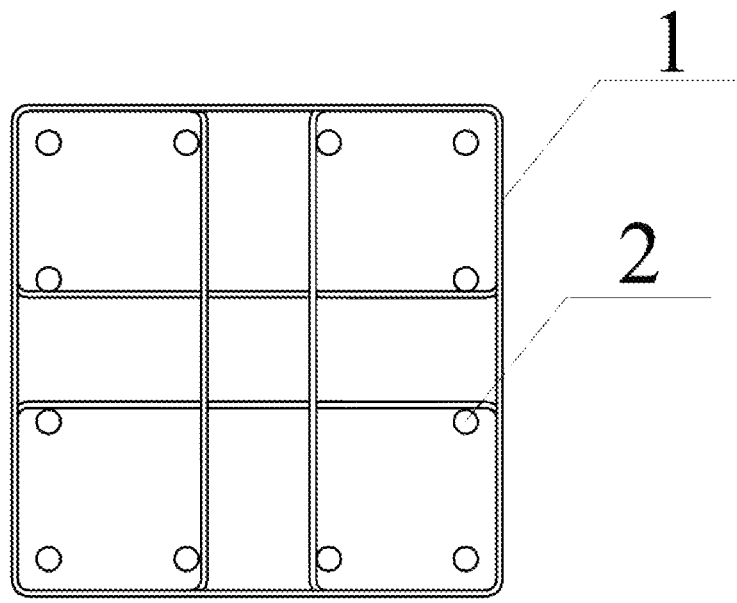
FIG. 2 is a schematic diagram of a positional relationship between first one-bar confinements and longitudinal bars in the present embodiment.
Figure 3:
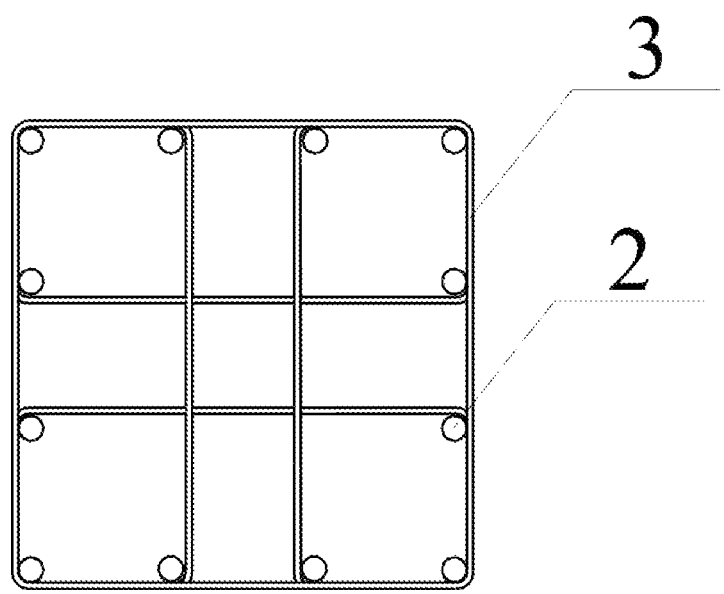
FIG. 3 is a schematic diagram of a positional relationship between second one-bar confinements and longitudinal bars in the present embodiment.
Figure 4:
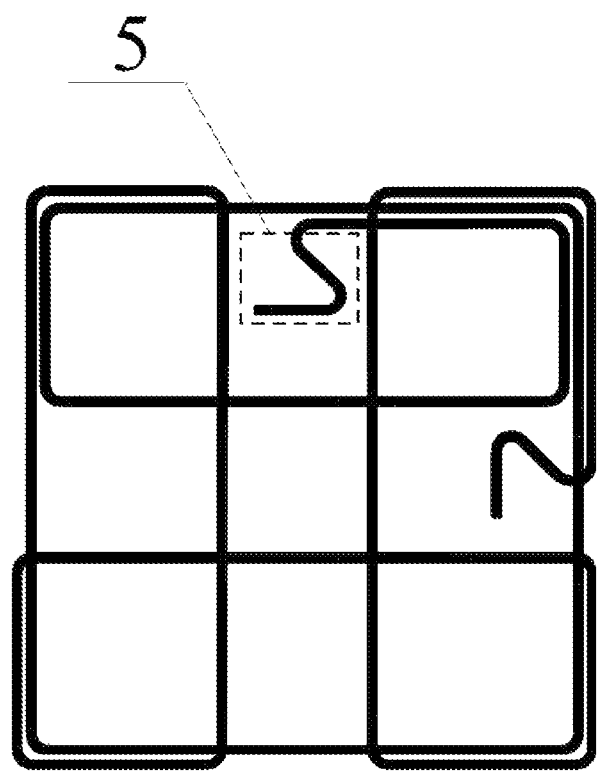
FIG. 4 is a schematic structural diagram of the first one-bar confinements and the second one-bar confinements as well as the corresponding anchoring ends in the present embodiment.

A reinforced recycled lump/aggregate concrete precast column in the present embodiment includes a plurality of first one-bar confinements 1, longitudinal bars 2, a plurality of second one-bar confinements 3, a plastic hinge region 4, and recycled lump/aggregate concrete, as shown in FIG. 1 (in order to clearly show specific arrangement of longitudinal bars and stirrups inside the column, part of fresh concrete of the column is hidden);

each of the first one-bar confinements 1 and the second one-bar confinements 3 is provided with an anchoring end 5;

the first one-bar confinements 1 and the second one-bar confinements 3 are alternately arranged in the plastic hinge region 4, and a spacing between the adjacent first one-bar confinement 1 and second one-bar confinement 3 is 50 mm; only the second one-bar confinements 3 are arranged in a region outside the plastic hinge region 4, and a spacing between the two adjacent second one-bar confinements 3 is 200 mm; outer edges of the first one-bar confinements 1 are flush with outer surfaces of the reinforced recycled lump/aggregate concrete precast column, and the first one-bar confinements 1 are configured to restrain a concrete cover, as shown in FIG. 2; the second one-bar confinements 3 abut against the longitudinal bars 2, and the second one-bar confinements 3 are configured to restrain the longitudinal bars 2, as shown in FIG. 3;

each of the first one-bar confinements 1 and the second one-bar confinements 3 is a stirrup formed by bending a high-strength steel bar for multiple times, and the anchoring end 5 is formed by twice bending at 135°, as shown in FIG. 4 (the first one-bar confinements and the second one-bar confinements have a same structure except different sizes);

an interior of the reinforced recycled lump/aggregate concrete precast column is filled with recycled lump/aggregate concrete;

the recycled lump/aggregate concrete is mainly formed by mixing fresh concrete 6 with demolished concrete lumps 7; a mass ratio of recycled coarse aggregates to natural coarse aggregates in the fresh concrete 6 is 1: 1, and fine aggregates (natural sand) are completely replaced with excavated soil; and a mass ratio of the demolished concrete lumps 7 to the fresh concrete 6 is 2: 3. Table 1 is a mix proportion of the fresh concrete 6 in the present embodiment, wherein cement is Shijing brand 42.5R ordinary Portland cement, the excavated soil is taken from Alluvial-Proluvial soil 5.5 m under the ground of a foundation pit in a supporting engineering project for underground comprehensive pipe gallery and road fast transformation of Guanghua first-class highway, and particles with a particle size larger than 4.75 mm should be screened out before use; the natural coarse aggregates with a particle size less than 26.5 mm are purchased from a factory near Guangzhou Nursery; the recycled coarse aggregates with a particle size less than 26.5 mm are obtained from crushing waste concrete at a Taicheng crushing yard in Baiyun District, Guangzhou; and a water reducer is a Sika 540P solid polycarboxylate water reducer. The actually measured slump of the fresh concrete 6 obtained according to the mix proportion in Table 1 is 195 mm, and the actually measured compressive strength can reach 41.4 MPa. According to this mix proportion and the mass ratio of the demolished concrete lumps 7 to the fresh concrete 6, it may be calculated that the construction and demolition wastes (including the excavated soil, the recycled coarse aggregates, and the demolished concrete lumps) accounts for 70% of the total mass of the concrete.

TABLE 1

Mix proportion of fresh concrete

| Water (kg/m³) | Cement (kg/m³) | Fine aggregates (kg/m³) Excavated soil | Coarse aggregates (kg/m³) | | Water reducer |
|---|---|---|---|---|---|
| | | | Natural coarse aggregates | Recycled coarse aggregates | |
| 226 | 430 | 614 | 570 | 570 | 0.39 |

In this embodiment, a cross-sectional size of the reinforced recycled lump/aggregate concrete precast column is 400 mm×400 mm, and a height of the reinforced recycled lump/aggregate concrete precast column is 4,000 mm. A thickness of the concrete cover is 25 mm. A height of the plastic hinge region 4 is 800 mm.

In this embodiment, both the first one-bar confinements 1 and the second one-bar confinements 3 adopt HRB600 hot-rolled steel bars with a diameter of 8 mm; the longitudinal bars 2 adopt HRB400 hot-rolled steel bars with a diameter of 20 mm; a length of two straight segments of the anchoring end 5 is 80 mm; a strength grade of the fresh concrete 6 is C40; and a strength grade of the demolished concrete lumps 7 is C30, and a characteristic size of the demolished concrete lumps 7 is ranged from 60 to 100 mm.

A construction method for the reinforced recycled lump/aggregate concrete precast column includes the following steps:

(1): processing and making a plurality of first one-bar confinements 1, longitudinal bars 2, and a plurality of second one-bar confinements 3;

(2): arranging the longitudinal bars 2, positioning a vertical position of each of the first one-bar confinements 1 and the second one-bar confinements 3, and simultaneously positioning a relative horizontal position between each of the first one-bar confinements 1 and each of the longitudinal bars 2;

(3): alternately arranging the first one-bar confinements 1 and the second one-bar confinements 3 in the plastic hinge region 4 in sequence, and simultaneously completing arranging of the second one-bar confinements 3 in the remaining region;

(4): completing formwork making and horizontal installation of the reinforced recycled lump/aggregate concrete precast column, at this time an outer edge of each of the first one-bar confinements 1 being in contact with an inner surface of a formwork; and (5): fully wetting demolished concrete lumps 7 in advance, and casting the reinforced recycled lump/aggregate concrete precast column by means of horizontal construction; and during casting, first putting the demolished concrete lumps 7 into the formwork at a time, then pouring fresh concrete 6 into the formwork and fully vibrating until the casting is completed.

As described above, the present invention may be better implemented. The present invention significantly increases the total recycling ratio (may reach 70%, far higher than that of conventional recycled aggregate concrete (generally at most about 25%) and conventional recycled lump concrete (generally at most about 40%)) of the construction and demolition wastes in the concrete.

The implementations of the present invention are not limited by the above-mentioned embodiments, and any other changes, modifications, substitutions, combinations, and simplifications made without departing from the spirit and principle of the present disclosure shall be equivalent substitution modes, which are included within the scope of protection of the present disclosure.

What is claimed is:

1. A reinforced recycled lump/aggregate concrete precast column, comprising a plurality of first one-bar confinements, longitudinal bars, a plurality of second one-bar confinements, a plastic hinge region, and recycled lump/aggregate concrete;

each of the first one-bar confinements and each of the second one-bar confinements being provided with an anchoring end;

the plurality of first one-bar confinements and some of the plurality of second one-bar confinements being arranged in the plastic hinge region, and some of the second one-bar confinements being arranged outside the plastic hinge region; outer edges of the first one-bar confinements being flush with outer surfaces of the reinforced recycled lump/aggregate concrete precast column, the first one-bar confinements being configured to restrain a concrete cover, and a vertical spacing between two adjacent first one-bar confinements being not greater than 200 mm; the second one-bar confinements abutting against the longitudinal bars, and the second one-bar confinements being configured to restrain the longitudinal bars;

the anchoring end being formed by bending at 135° twice; and an interior of the reinforced recycled lump/aggregate concrete precast column being filled with the recycled lump/aggregate concrete, the recycled lump/aggregate concrete consisting of fresh concrete and demolished concrete lumps, and the fresh concrete being recycled aggregate concrete containing recycled coarse aggregates and excavated soil, wherein a mass ratio of the recycled coarse aggregates to natural coarse aggregates in the fresh concrete is not greater than 4, the excavated soil partially or completely replaces natural sand, and a mass ratio of the excavated soil to the natural sand is not less than 1 a strength grade of the fresh concrete is not lower than C40; and the demolished concrete lumps are lumps formed by breaking old buildings, structures, and roads after removing all or part of steel bars, and a characteristic size of each of the demolished concrete lumps is not less than 60 mm.

2. The reinforced recycled lump/aggregate concrete precast column according to claim 1, wherein a mass ratio of the demolished concrete lumps to the fresh concrete in the recycled lump/aggregate concrete is 1:4 to 2:3.

3. The reinforced recycled lump/aggregate concrete precast column according to claim 2, wherein each of the first one-bar confinements and each of the second one-bar confinements is a stirrup formed by bending a high-strength steel bar for multiple times, and a size of the outer edge of each of the first one-bar confinements is larger than the size of an outer edge of each of the second one-bar confinements.

4. The reinforced recycled lump/aggregate concrete precast column according to claim 3, wherein a length of each of two straight segments of the anchoring end is not less than a larger value in 10 d and 75 mm, and d is a diameter of the stirrup.

5. The reinforced recycled lump/aggregate concrete precast column according to claim 4, wherein a height of the plastic hinge region is between 1.0 h and 2.0 h, and h is a cross-sectional height of the reinforced recycled lump/aggregate concrete precast column.

6. The reinforced recycled lump/aggregate concrete precast column according to claim 5, wherein a spacing between the two adjacent second one-bar confinements in the plastic hinge region is not greater than a smaller value in 6 D and 100 mm, and D is a minimum diameter of the longitudinal bars; and a spacing between the two adjacent second one-bar confinements outside the plastic hinge region is not greater than 10 D.

7. The reinforced recycled lump/aggregate concrete precast column according to claim 1, wherein a yield strength of each of the first one-bar confinements and the second one-bar confinements is not less than 500 MPa.

8. The reinforced recycled lump/aggregate concrete precast column according to claim 2, wherein a yield strength of each of the first one-bar confinements and the second one-bar confinements is not less than 500 MPa.

9. The reinforced recycled lump/aggregate concrete precast column according to claim 3, wherein a yield strength of each of the first one-bar confinements and the second one-bar confinements is not less than 500 MPa.

10. The reinforced recycled lump/aggregate concrete precast column according to claim 4, wherein a yield strength of each of the first one-bar confinements and the second one-bar confinements is not less than 500 MPa.

* * * * *